US010627239B2

(12) United States Patent
Zhao et al.

(10) Patent No.: US 10,627,239 B2
(45) Date of Patent: Apr. 21, 2020

(54) METHODS, ARCHITECTURES, APPARATUSES, SYSTEMS DIRECTED TO IMPROVED DEAD RECKONING FOR PEDESTRIAN NAVIGATION

(71) Applicant: IDHL Holdings, Inc., Wilmington, DE (US)

(72) Inventors: Zhanlue Zhao, Boyds, MD (US); Bryan A. Cook, Silver Spring, MD (US)

(73) Assignee: IDHL Holdings, Inc., Wilmington, DE (US)

( * ) Notice: Subject to any disclaimer, the term of this patent is extended or adjusted under 35 U.S.C. 154(b) by 0 days.

(21) Appl. No.: 16/422,526

(22) Filed: May 24, 2019

(65) Prior Publication Data

US 2019/0360813 A1 Nov. 28, 2019

Related U.S. Application Data

(60) Provisional application No. 62/676,279, filed on May 24, 2018.

(51) Int. Cl.
| | | |
|---|---|---|
| *G01C 21/18* | (2006.01) | |
| *H04W 4/024* | (2018.01) | |
| *H04W 4/02* | (2018.01) | |

(52) U.S. Cl.
CPC .......... *G01C 21/18* (2013.01); *H04W 4/024* (2018.02); *H04W 4/026* (2013.01); *H04W 4/027* (2013.01)

(58) Field of Classification Search
CPC ...... G01C 21/18; H04W 4/024; H04W 4/026; H04W 4/027
See application file for complete search history.

(56) References Cited

U.S. PATENT DOCUMENTS

| | | | | |
|---|---|---|---|---|
| 2015/0247729 A1* | 9/2015 | Meduna | ............... | H04W 4/027 702/150 |
| 2018/0259350 A1* | 9/2018 | Al-Hamad | .............. | G01S 19/42 |
| 2019/0323842 A1* | 10/2019 | Tateda | ................... | G08G 1/005 |

OTHER PUBLICATIONS

Ilkovicova, L'ubica, et al., "Pedestrian indoor positioning and tracking using smartphone sensors, step detection and map matching algorithm", Geodetski list, vol. 70 (93) No. 1, 2016, 24 pages.

Klingbeil, Lasse, et al., "A wireless sensor network for real-time indoor localisation and motion monitoring", 2008 International Conference on Information Processing in Sensor Networks, 2008, 12 pages.

(Continued)

*Primary Examiner* — Minjung Kim
(74) *Attorney, Agent, or Firm* — Julian F. Santos

(57) ABSTRACT

Methods, architectures, apparatuses, systems, devices, and computer program products directed to dead reckoning for pedestrian navigation ("pedestrian dead reckoning") and robust heading estimation in pedestrian dead reckoning. Pursuant to the methodologies and technologies provided herein, a walking direction may be derived or otherwise determined using a robust heading estimation mechanism in connection with, for example, step detection and step length determination. The robust heading estimation mechanism may be based on device orientation (e.g., on changes in device orientation). The device orientation may be obtained based on (e.g., by way of) fusion of accelerometer and gyroscope measurements.

20 Claims, 7 Drawing Sheets

(56) References Cited

OTHER PUBLICATIONS

Kuipers, Jack, "Quaternions and Rotation Sequences", Geometry, Integrability and Quantization, Sep. 1-10, 1999, Varna, Bulgaria, Ivaillo M. Mladenov and Gregory L. Naber, Editors, Coral Press, Sofia 2000, Sep. 1-10, 1999, 17 pages.

Li, Fan, et al., "A reliable and accurate indoor localization method using phone inertial sensors", UbiComp '12, Pittsburgh, USA., Sep. 5-8, 2012, 10 pages.

Liao, Jhen-Kai, et al., "The performance analysis of smartphone-based pedestrian dead reckoning and wireless locating technology for indoor navigation application", Inventions 2016, 1, 25; doi:10.3390/inventions1040025, www.mdpi.com/journal/inventions., Dec. 5, 2016, 19 pages.

Sakoe, Hiroki, et al., "Dynamic programming algorithms optimization for spoken word recognition", IEEE Transactions on acoustics, speech, and signal processing; vol. ASSP-26, No. 1, Feb. 1978, 7 pages.

Tian, Zengshan, et al., "Pedestrian dead reckoning for MARG navigation using a smartphone", EURASIP Journal on Advances in Signal Processing, 2014, 9 pages.

Weinberg, Harvey, "Using the ADXL202 in Pedometer and Personal Navigation Applications", Analog Devices; AN-602 Application Note, 2002, 8 pages.

Won, Kim J., et al., "A step, stride and heading determination for the pedestrian navigation system", Journal of Global Positioning Systems (2004), vol. 3, No. 1-2, 2004, 7 page.

\* cited by examiner

METHODS, ARCHITECTURES, APPARATUSES, SYSTEMS DIRECTED TO IMPROVED DEAD RECKONING FOR PEDESTRIAN NAVIGATION

CROSS-REFERENCE TO RELATED APPLICATIONS

This application claims the benefit of U.S. Provisional Patent Application No. 62/676,279, filed 24 May 2018; which is incorporated herein by reference.

BACKGROUND

The present disclosure is generally directed to the fields of communications, software and navigation, including, for example, to methods, architectures, apparatuses, systems directed to dead reckoning for pedestrian navigation ("pedestrian dead reckoning") and robust heading estimation in pedestrian dead reckoning.

Pedestrian dead reckoning (PDR) has uses in a variety of environments, applications and services. For instance, emergency personnel may be able to locate a person in an indoor environment under adverse conditions using mobile devices/applications employing PDR (e.g., in connection with location-based services). Other examples include customer navigation in shopping malls, supermarkets, etc.; traveler navigation in airports or train/subway stations and the like. PDR can be used to augment GPS and other location technologies (e.g., improve the tracking between satellite updates, help resolve positional errors caused by multi-path reception, fill in times where there is no signal, etc.), as well.

PDR, in general, involves advancing a previously determined position associated with the pedestrian using with a distance and direction that the pedestrian walks, e.g., on a step-by-step basis. Conventional PDR relies on revising the previously determined position using only a length of a current step and a heading of either the start or the end of the current step (where the current step is the first step after such position is determined). Such conventional PDR is prone to errors due to inconsistent and/or inaccurate step detection, inconsistent and/or inaccurate stride length computation and/or inconsistent and/or inaccurate walking direction computation. Missed or false steps, walking direction drift and mis-estimated stride length, for example, affect PDR accuracy. Further, assuming a magnetometer is employed, environment magnetic field interference can exacerbate walking heading error(s). Once introduced, the errors are carried forward each step taken thereafter. The carrying forward of the errors exacerbates PDR inaccuracy due to each determined position that follows the introduced errors including the prior determined position inaccuracy. And unless controlled, the carrying forward of the errors, especially those associated with heading and/or that distort walking trajectory, may make any resulting conventional PDR determination unsuitable for integration with mapping or other positioning signals, e.g., GPS or GPS-like indoor positioning measurements, and in turn, for use in various environments, such as indoors.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

Figure 1:
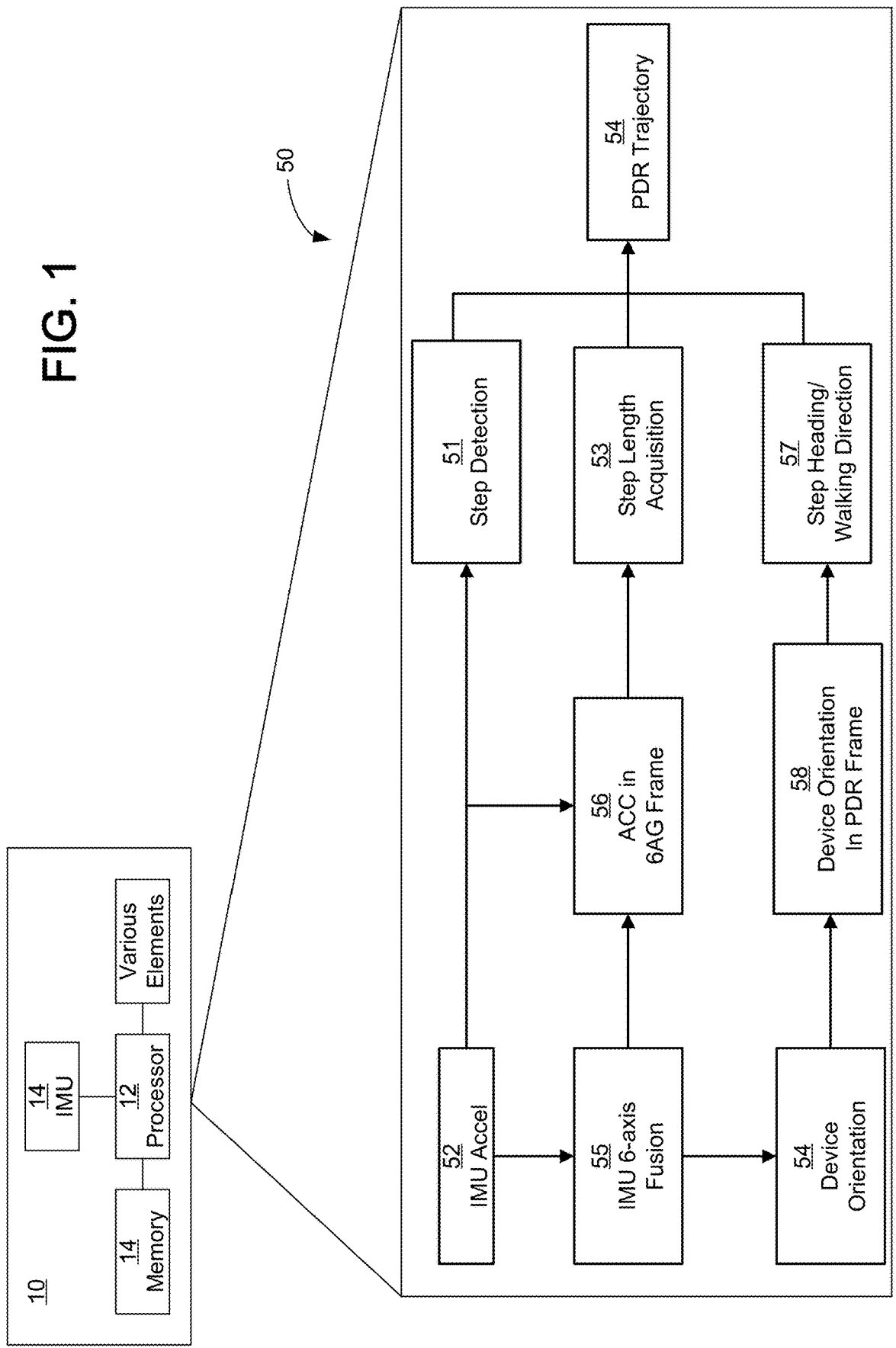
FIG. 1 is a block diagram illustrating a representative device in which one or more embodiments may be implemented.

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Overview

As would be appreciated by a person of skill in the art based on the teachings herein, encompassed within the embodiments described herein, without limitation, are procedures, methods, architectures, apparatuses, systems, devices, and computer program products directed to dead pedestrian dead reckoning and robust heading estimation in pedestrian dead reckoning. As used herein, the term pedestrian may refer to any of a human, a robot and any other type of pedestrian.

Pursuant to the methodologies and technologies provided herein, a walking direction may be derived or otherwise determined using the robust heading estimation. The robust heading estimation may be used in connection with, for example, step detection and step length determination (e.g., using and/or based on a step length algorithm). The robust heading estimation may be based on device orientation (e.g., on changes in device orientation). The device orientation may be obtained based on (e.g., by way of) fusion of accelerometer and gyroscope measurements. The device may remain in the same orientation relative to the body (e.g., a point on the body) of the pedestrian during walking. Alternatively, device orientation may change relative to the body of the pedestrian during walking.

Pursuant to the robust heading estimation, a trajectory shape of good accuracy may be achieved. Further, the robust heading estimation may be immune to indoor magnetic interference. These and other benefits make the robust heading estimation mechanism particularly useful for integration with mapping or other positioning signals, e.g., GPS or GPS-like indoor positioning measurements.

Among the apparatuses provided herein is an apparatus comprising a processor, a three-axis accelerometer and a three-axis gyroscope. The three-axis accelerometer may determine an acceleration of the apparatus and may output acceleration measurements associated therewith. The three-axis gyroscope may determine rotation of the apparatus and may output angular velocity measurements associated therewith. The acceleration measurements and angular velocity measurements may be communicatively provided to the processor in any of separate and combined (fused) form. In an embodiment, the processor may perform step detection of a pedestrian based on the acceleration measurements. The processor may obtain (e.g., acquire and/or determine) a step length for a detected step. The processor may determine an initial device orientation based on the linear acceleration and angular velocity measurements associated with a start of the detected step. The processor may determine multiple sub-step headings along the step length. Each sub-step heading may be based on a device orientation relative to the initial device orientation. Each device orientation may be based on the linear acceleration and angular velocity measurements associated with a point along the step length. The processor may determine a device trajectory based on the multiple sub-step headings. The processor may determine a step heading as a function of the device trajectory. The processor may output the step heading.

In an embodiment, the processor may determine the initial device orientation based on an angular position derived from the linear acceleration and angular velocity measurements associated with the start of the detected step. In an embodiment, the angular position may be referenced to a frame having a heading that is not determined from geomagnetic measurements made locally at the apparatus. In an embodiment. the angular position may be referenced to a frame having an arbitrary heading. In an embodiment, the initial device orientation may define a device heading of zero.

In an embodiment, each device orientation may be based on an angular position derived from the linear acceleration and angular velocity measurements associated with a point along the step length. In an embodiment, the angular position may be referenced to a frame having a heading that is not determined from geomagnetic measurements made locally at the apparatus. In an embodiment, the angular position may be referenced to a frame having an arbitrary heading.

In an embodiment, the processor may determine the initial device orientation at least in part by transforming the corresponding derived angular position to define a PDR frame having a heading of zero degrees, and may determine the multiple sub-step headings at least in part by, for each device orientation, device heading, transforming the corresponding derived angular position so as to refer from the PDR frame.

In an embodiment, the processor may determine the step length based on the acceleration measurements that correspond to movement of the device along an axis perpendicular to a plane defined by translational movement of the device associated with the detected step. In an embodiment, the processor may determine the step length based on the acceleration measurements that correspond to movement of the device along an axis aligned to gravity.

Among the methods provided herein is a method directed to PDR using a device comprising a processor, a three-axis accelerometer and a three-axis gyroscope. The three-axis accelerometer may determine an acceleration of the device and output acceleration measurements associated therewith. The three-axis gyroscope may determine rotation of the devoce and output angular velocity measurements associated therewith. The acceleration measurements and angular velocity measurements may be communicatively provided to the processor in any of separate and combined (fused) form. In an embodiment, the method may include any of performing step detection of a pedestrian, at the processor, based on the acceleration measurements; obtaining, at the processor, a step length for a detected step; determining, at the processor, an initial device orientation based on the linear acceleration and angular velocity measurements associated with a start of the detected step; determining, at the processor, multiple sub-step headings along the step length, wherein each sub-step heading may be based on a device orientation relative to the initial device orientation, and wherein each device orientation may be based on the linear acceleration and angular velocity measurements associated with a point along the step length; determining, at the processor, a device trajectory based on the multiple sub-step headings; determining, at the processor, a step heading as a function of the device trajectory; and outputting the step heading.

In an embodiment, determining an initial device orientation may include determining the initial device orientation based on an angular position derived from fusion of the linear acceleration and angular velocity measurements associated with a start of the detected step. In an embodiment, the angular position may be referenced to a frame having a heading that is not determined from geomagnetic measurements made locally at the device (e.g., by a magnetometer). In an embodiment, the angular position may be referenced to a frame having an arbitrary heading. In an embodiment, the method may include determining the angular position. In an embodiment, the initial device orientation may define a device heading of zero.

In an embodiment, each device orientation may be based on an angular position derived from fusion of the linear acceleration and angular velocity associated with its corresponding point along the step length. In an embodiment, each angular position may be referenced to a frame having a heading that is not determined from geomagnetic measurements made locally at the device (e.g., by a magnetometer). In an embodiment, each angular position may be referenced to a frame having an arbitrary heading.

In an embodiment, the method may include determining each of the angular position. In an embodiment, the method may include determining the initial device orientation at least in part by transforming the corresponding derived angular position to define a PDR frame having a heading of zero degrees, and may determine the multiple sub-step headings at least in part by, for each device orientation, device heading, transforming the corresponding derived angular position so as to refer from the PDR frame.

In an embodiment, the method may include determining the step length based on the acceleration measurements that correspond to movement of the device along an axis perpendicular to a plane defined by translational movement of the device associated with the detected step. In an embodiment, the method may include determining the step length based on the acceleration measurements that correspond to movement of the device along an axis aligned to gravity.

As or if used herein, the term "position" may refer to linear position, angular position, or a combination of both linear position and angular position. The term "pose" is a common industry term for a combination of linear position and angular position. Linear position may refer to the location that may be defined by any number of methods including a 3D vector of Cartesian coordinates, a 3D vector of spherical coordinates, etc. Angular position may refer to a 3D orientation that may be defined by any number of methods including Euler angles, direction cosine matrix, quaternion, vector/angle, Pauli spin matrix, direction+normal vector, etc. For simplicity of exposition, the description that follows refers to angular position in terms of quaternion.

Those skilled in the art will recognize that other definitions of angular position are (e.g. equally) applicable to some or all of the disclosure and various disclosed embodiments described in connection with angular position in terms of quaternion and can be modified accordingly without undue experimentation. Also, for simplicity of exposition, various disclosed embodiments herein supra and infra are described as utilizing a particular common reference frame, namely, an Earth frame. Those skilled in the art will recognize that a common reference frame other than the Earth frame may be utilized and some or all of the disclosure and various disclosed embodiments can be modified accordingly without undue experimentation. Examples of the common reference frame may include a user frame, a level frame and an arbitrary frame.

Although various embodiments are described and/or claimed herein in which an apparatus, system, device, etc. and/or any element thereof are configured to carry out an operation, process, algorithm, function, etc. and/or any portion thereof, it is be understood that any embodiments described and/or claimed herein assume that any apparatus, system, device, etc. and/or any element thereof may carry out any such operation, process, algorithm, function, etc. and/or any portion thereof (and vice versa).

Representative Device Architectures

FIG. 1 is a block diagram illustrating a representative device 10 in which one or more embodiments may be implemented. The device 10 may be configured to provide navigation information and/or PDR output to a user. The term "user" in the preceding sentence may refer to a human or a machine and/or to a user interface.

The device 10 may include a processor 12 communicatively coupled with an inertial measurement unit (IMU) 14 and memory 16. The memory 16 may include instructions executable by the processor 12, including instructions for carrying out any of various embodiments (e.g., representative procedures) disclosed herein. In various embodiments, the device 10 may be, may be configured as and/or configured with various elements of a wireless transmit and receive unit (WTRU). Example details of WTRUs and elements thereof are provided herein in FIGS. 4A-4D and accompanying disclosure.

The IMU 14 may include an accelerometer and a gyroscope. Alternatively, the IMU 14 may include an accelerometer, a gyroscope and a magnetometer. The accelerometer, gyroscope and magnetometer may be, for example, a three-axis accelerometer, a three-axis gyroscope and a three-axis magnetometer, respectively. The IMU 14 may output inertial measurements corresponding to, and/or derived from, measurements made by, any of the accelerometer, the gyroscope and the magnetometer. The inertial measurement may include, for example, linear acceleration and angular velocity measurements corresponding to, and/or derived from, measurements made by, the accelerometer and gyroscope, respectively. The inertial measurements may include an angular position or estimate of angular position (collectively "angular position") of the device 10. Alternatively, the angular position of the device 100 may be determined by the processor 12 using the inertial measurement data received from the IMU 14. In an embodiment, the angular position may be derived from fusion of linear acceleration and angular velocity measurements.

Further details of an IMU, which may be representative of the IMU 14, may be found in U.S. patent application Ser. No. 11/119,719, filed May 2, 2005 (now U.S. Pat. No. 7,158,118), and U.S. patent application Ser. No. 11/119,663, filed on May 2, 2005 (now U.S. Pat. No. 7,239,301); each of which is incorporated herein by reference in its entirety. Examples of an IMU, any of which may be representative of the IMU 14, may include BNO 070 and BNO 080 available from Hillcrest Laboratories, Inc.

Various frames of reference ("frames") that may be associated with the device 100. The various frames may include an Earth frame, a device frame, a sensor frame and a PDR frame. The device frame may be associated with the device 10, and may correspond to (e.g., be aligned to, at a known offset from, etc.) to a point of the device 10. The sensor frame may be associated with the IMU 14, and may correspond to (e.g., be aligned to, at a known offset from, etc.) the IMU 14. The terms "sensor frame", "inertial frame" and "body frame" are synonymous industry terms and may be used interchangeably herein.

Representative Analysis of Accumulated Heading Error

In a PDR system, if at step k at time t(k) a position of a pedestrian ("pedestrian position") is $p_k=[x_k\ y_k]$ and if at step k+1 at time t(k+1) a stride length is $l_{k+1}$ and a walking direction is $\varphi_{k+1}$, then the pedestrian position at step k+1 may be expressed as:

$$p_{k+1}=p_k+[l_{k+1}*\sin(\varphi_{k+1})\ l_{k+1}*\cos(\varphi_{k+1})] \quad (1)$$

The pedestrian position has a linear relationship with step length provided that step heading is accurate. The shape of a walking trajectory that is determined (e.g., estimated) based on inaccurate, but consistent step lengths (i.e., $l_k=r*l_k^{true}$, r>0) differs only in scale from the shape of a walking trajectory determined based on accurate step lengths. The shape of a walking trajectory that is determined based on inaccurate step headings exhibits distortion (i.e., not mere differences in scale) as compared to the shape of a walking trajectory that is determined based on accurate step headings. Such distortion, if left unfettered, may result in a PDR determination that is unsuitable for mapping integration with other positioning signals, e.g., GPS or GPS-like indoor positioning measurement.

A source (e.g., a prominent source) of the distortion may be heading drift. The amount of distortion may be controlled by controlling heading drift. Depending on the accuracy, tolerances, etc., needed for a particular application, the amount of distortion may be limited by controlling heading drift in accordance with a threshold that is configured for such application and/or parameters. An example of this is provided below in connection with FIG. 2.

Figure 2:
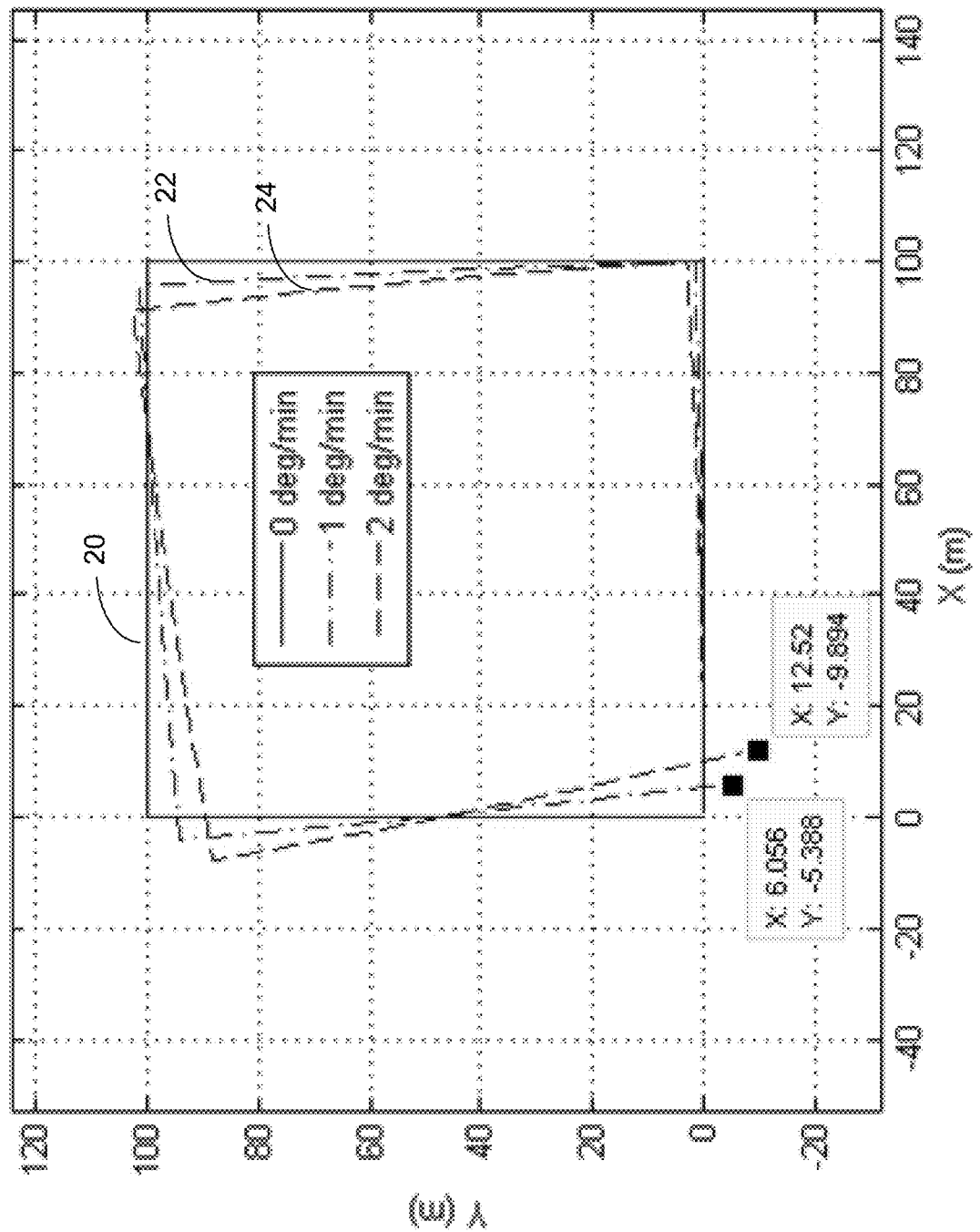
FIG. 2 illustrates example walking trajectory shapes at different heading drift rates.

Referring to FIG. 2, example walking trajectories 20, 22 and 24 at different heading drift rates are illustrated. Each of the walking trajectories 20, 22 and 24 corresponds to a square-shaped walking trajectory of 400 meters (100 meters per side) that a pedestrian walks at a speed of 3.6 km/hour. The heading drift rates for the walking trajectories 20, 22 and 24 are 0 degrees per minute ("deg/min"), 1 deg/min and 2 deg/min, respectively. The distortions exhibited by the walking trajectories 22 and 24 reflect the effects of respective walking heading errors on the square-shaped walking trajectory. For example, the walking trajectory 22 illustrates that, with a heading drift rate of 1 deg/min, the walking heading errors result in a drift of 8.11 m from the truth after 400 m of walking. The walking trajectory 24 illustrates that, with a heading drift rate of 2 deg/min, the walking heading errors result in a drift of 15.96 m from the truth after 400 m of walking. An acceptable amount of distortion for a particular application may be no greater than that of walking trajectory 22, and hence, such acceptable amount of distortion may be achieved by controlling heading drift in accordance with a threshold of 1 deg/min. Pursuant to the methodologies and technologies provided herein, such walking heading errors may be controlled.

Representative Robust Walking Direction Acquisition Procedure(s)

Referring back to FIG. 1, the device 10 may be configured to carry out representative procedure 50. The device 10 may perform step detection (51) based on acceleration measurements (52) output from the accelerometer. The step detection may be carried out in accordance with any of various methodologies, including, for example, as set forth in any of Li, et al., "A Reliable and Accurate Indoor Localization Method Using Phone Inertial Sensors", Proceedings of the 2012 ACM Conference on Ubiquitous Computing, 2012, pp. 421-430 (hereinafter "[1]") and Kim, et al., "A step, stride and heading determination for the pedestrian navigation system", J. Global Position System. 2004, 3, 273-279 (hereinafter "[2]"), each of which is incorporated herein by reference.

The device 10 may acquire a step length for detected step k (53). The device 10, for example, may determine the step length based on linear acceleration measurements (56). In an embodiment, the device 10 may compute the step length using linear acceleration measurements along an up-down gravity direction, where the up-down gravity direction may be defined according to H. Weinberg, "Using the ADXL202 in pedometer and personal navigation applications", Analog Devices AN-602 application note, 2002 (hereinafter "[3]"), which is incorporated herein by reference. As an example, the step length for step k may be determined using the following equation:

$$l_k = \gamma (\max(z_{t(k):t(k)+stepRange(k)}) - \min(z_{t(k):t(k)+stepRange(k)}))^{1/4} \quad (2)$$

where $z_{t(k):t(k)+stepRange(k)}$ are the acceleration measurements along a Z axis of a PDR frame in step k, and the Z axis of the PDR frame in step k may align with the up-down gravity direction. In an embodiment, the parameter $\gamma=0.41$. An advantage of using equation (2) is that the error is bounded and consistent across different pedestrians.

In an embodiment, the step length may be fixed value acquired from the memory 14 and/or form a source remotely located from the device 10. In an embodiment, the device 10 may acquire and/or determine a best match and/or a best scaling to fit PDR trajectory (54) to a measured trajectory by another sensor (e.g., GPS). Various other ways to acquire the step length may be found in [1]; [2]; Ilkovičová, et al., "Pedestrian Indoor Positioning and Tracking using Smartphone Sensors, Step Detection and Map Matching Algorithm", International Symposium on Engineering Geodesy, 20-22 May 2016, Varaždin, Croatia, pp. 439-450 (hereinafter "[4]"); Tian, et al., "Pedestrian dead reckoning for MARG navigation using a smartphone", EURASIP Journal on Advances in Signal Processing 2014, 2014:65 (hereinafter "[5]"); and Liao, et al., "The Performance Analysis of Smartphone-Based Pedestrian Dead Reckoning and Wireless Locating Technology for Indoor Navigation Application, Inventions 2016", 1, 25 (hereinafter "[6]"). Each of [4], [5] and [6] is incorporated herein by reference.

The device 10 may determine walking heading in accordance with the following.

The device 10 may determine a device orientation (54) based on an angular position derived from fusion of linear acceleration and angular velocity measurements (55) for each of N samples taken during detected step k (51). Using an angular position derived from 6-axis sensor fusion of the linear acceleration and angular velocity measurements (55) may immunize device orientation(s) from magnetic field interference.

In an embodiment, the device orientation may be fixed relative to the body of the pedestrian. This way, the device heading only changes along with respective changes in the walking direction. In other words, when the device orientation is fixed relative to the body of the pedestrian a change in device heading may indicate a walking direction change because such change corresponds directly to a change in walking direction. In an embodiment, this constraint can be relaxed, and the walking direction may be detected even if the device orientation changes. To facilitate the walking direction computation and, in certain situations, walking direction adjustment after device orientation changes, a PDR frame is used in which the device orientation quaternion is [1 0 0 0] at the walking starting time and/or once (or after) the device orientation change finishes.

Representative PDR Frame and Device Heading at Each Sample

The device orientations determined by the device 10 may include an initial device orientation associated with a start of the detected step k and multiple device orientations ("sub-step device orientations") associated with respective points along the step length of the detected step (e.g., corresponding to samples taken during the detected step k). The device heading starts arbitrarily in the Earth frame given that, without magnetometer measurements being included in the sensor fusion (55), absolute north is not available. The device 10 may determine the initial device orientation and set it as a frame of reference, namely. the PDR frame, and may determine each of the sub-step device orientations with reference to the PDR frame. As an example, device 10 may determine the initial device orientation and set it as the PDR frame, $q_0^{pdr}$, as follows:

$$q_0^{pdr} = \text{qmult}(q_0^{game}, \text{qconj}(q_0^{game})) = [1 0 0 0]. \quad (3)$$

where $q_0^{game}$ represents the IMU fusion (55) output at time t(0), qmult($q_1$, $q_2$) computes quaternion multiplication between $q_1$ and $q_2$, and qconj(q) computes the conjugate of q. Examples of the qmult($q_1$, $q_2$) and qconj(q) operations may be found in J. B. Kuipers, "Quaternions and Rotation Sequences", Princeton University Press, 1999 (hereinafter "[7]"), which is incorporated herein by reference. Since the device orientation quaternion in the PDR frame at the initial time $q_0^{pdr}$ is always [1 0 0 0], the PDR heading always starts at 0 degrees.

The device 10 may determine each sub-step device orientation in the PDR frame, $q_k^{pdr}$, as follows:

$$p_k^{pdr} = \text{qmult}(q_k^{game}, \text{qconj}(q_0^{game})). \quad (4)$$

where $q_k^{game}$ represents the IMU fusion (55) output at time t(k) is qmult($q_1$, $q_2$) computes quaternion multiplication between $q_1$ and $q_2$, and qconj(q) computes the conjugate of q.

The device 10 may determine each sub-step device heading between time t(k) and time t(k+1) transforming or otherwise converting the sub-step device orientation in the PDR frame, $q_k^{pdr}$ As an example, the device 10 may convert $q_k^{pdr}$ into Euler angles as follows:

$$[\text{roll}_k \text{ pitch}_k \text{yaw}_k] = \text{q2euler}(q_k^{pdr}) \quad (5)$$

where q2euler(q) converts the quaternion to Euler angles. Examples of the q2euler(q) operation may be found in [7]. The device 10 may establish (e.g., from equation (5)) each sub-step device heading between time t(k) and time t(k+1) as:

$$\varphi_t = \text{yaw}_t \quad (6)$$

Within each step the device orientation may vary. Although the variation of device heading may be small, as disclosed supra, the current convention of using a device heading at the moment as a step is detected or completed as the walking heading is likely to introduce and accumulate walking heading errors. The device 10 may determine a device trajectory within each step based on the multiple sub-step headings (e.g., using some or all of the sub-step device heading measurements). The sub-step device heading measurements may be used in different ways; two of which are provided below.

Method 1:

Assuming there are N device heading measurements in one step and the device headings in PDR frame are $\varphi_i$, i=1, ..., N, the corresponding position coordinates of the device 10 may be determined as follows:

$$p_{i+1}=p_i+a*[\sin(\varphi_{i+1})\cos(\varphi_{i+1})] \quad (7)$$

where $p_1=[0\ 0]$ at the start of each step and a may be the device moving length in each sampling period. In an embodiment, each of these sub-steps may be the same length. The coordinates $p_i$, i=1, ..., N may describe the shape of the step trajectory. The device 10 may determine any of a step heading and a walking direction (57) as a function of the device (or step) trajectory. For example, the step heading in the direction along a line from position $p_1$ towards $p_N$, may be determined by:

$$\text{stepHeading}=a\tan 2(p_N(2),p_N(1))=a\tan 2(\Sigma_{i=1}^N \cos(\varphi_i),\Sigma_{i=1}^N \sin(\varphi_i)) \quad (8)$$

The device 10 may output the determined step heading.

Figure 3:
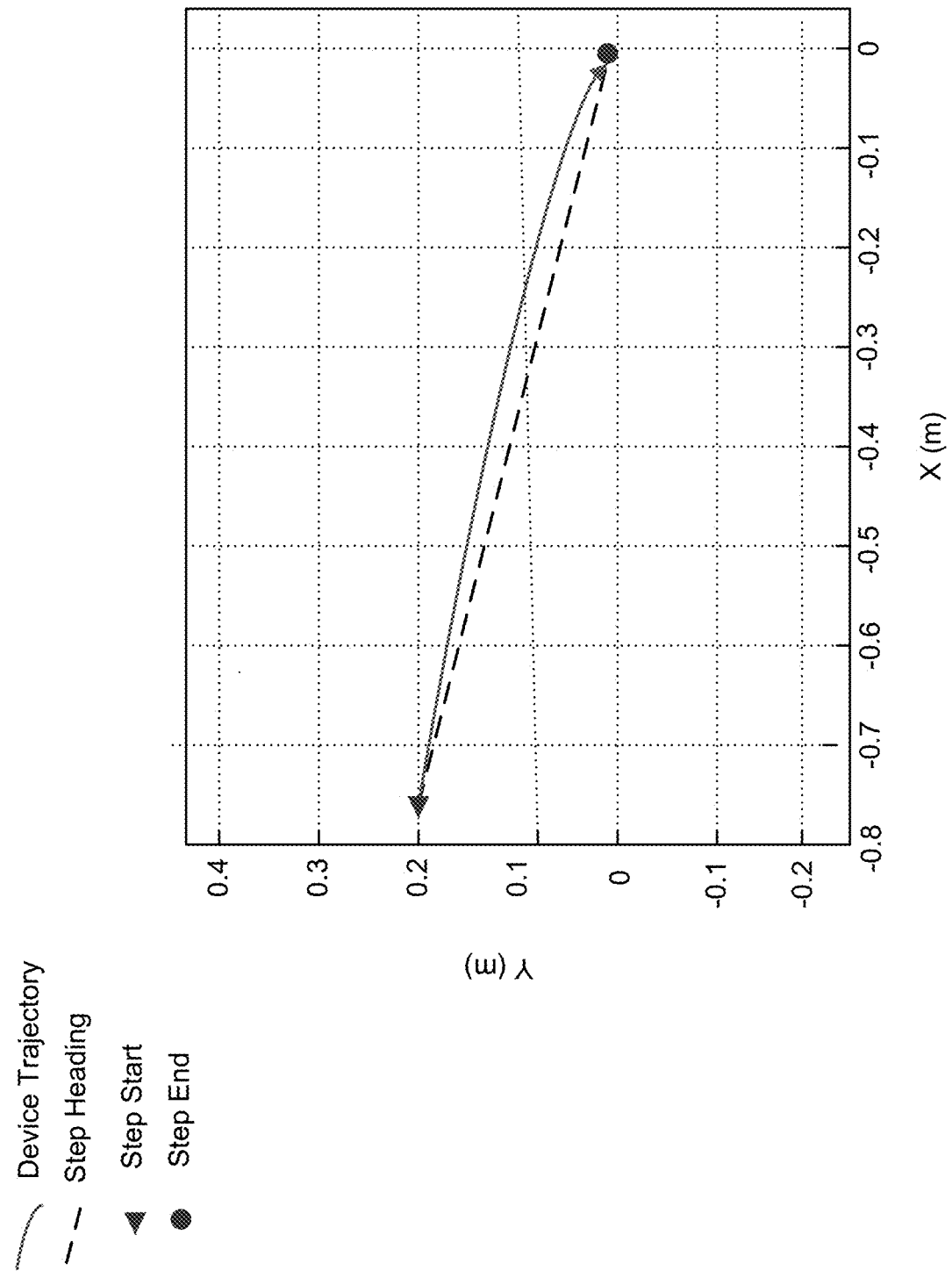
FIG. 3 illustrates example step heading and sub-step device headings.

Examples of a step heading and sub-step device headings are shown in FIG. 3. Because the step heading is determined using the N sub-step device headings, it is more robust and consistent than a conventional solution in which the device heading is selected at a particular time during step detection. The device 10 may output the determined step heading.

Method 2:

Another computationally efficient method is to use the average of the device headings in one step as the step heading (57)

$$\text{Let } \bar{\varphi}=\frac{1}{N}\sum_{i=1}^N \varphi_i,\ \varphi_i=\bar{\varphi}+\tilde{\varphi}_i,\ \text{then} \quad (9)$$

$$\sum_{i=1}^N \cos(\varphi_i)=\sum_{i=1}^N \cos(\bar{\varphi}+\tilde{\varphi}_i)$$

$$=\sum_{i=1}^N (\cos(\bar{\varphi})\cos(\tilde{\varphi}_i)-\sin(\bar{\varphi})\sin(\tilde{\varphi}_i))$$

$$=\cos(\bar{\varphi})\sum_{i=1}^N \cos(\tilde{\varphi}_i)+\sin(\bar{\varphi})\sum_{i=1}^N \sin(\tilde{\varphi}_i)$$

$$\approx N*\cos(\bar{\varphi})$$

The last approximation is because $\Sigma_{i=1}^N \tilde{\varphi}_i=0$, $\sin(-x)=-\sin(x)$, and $\sin(x)\cong x$, $\cos(x)\cong 1$ when x is close to 0. Similarly, $$\sum_{i=1}^N \sin(\varphi_i)=\sum_{i=1}^N \sin(\bar{\varphi}+\tilde{\varphi}_i) \quad (10)$$

$$=\sum_{i=1}^N (\cos(\bar{\varphi})\sin(\tilde{\varphi}_i)+\sin(\bar{\varphi})\cos(\tilde{\varphi}_i))$$

$$\approx N*\sin(\bar{\varphi})$$

Therefore, the device 10 may determine (approximate) the step heading (57) as follows:

$$\text{stepHeading}=a\tan 2(N*\cos(\bar{\varphi}),N*\sin(\bar{\varphi}))=\bar{\varphi} \quad (11)$$

The device 10 may output the determined step heading. The difference in step headings determined using method 1 and method 2 may be small at each step. For example, when (has a normal distribution with the zero mean and standard deviation of 5 degrees, Monte-Carlo simulations have shown the average difference in step headings determined using method 1 and method 2 is about 0.2 degrees.

Representative Walking Direction Estimation when Device Orientation Changes

As noted above, in some embodiments, the device orientation relative to the pedestrian's body is fixed during walking. This constraint can be relaxed as follows. When the device orientation relative the user body changes, the walking direction stays the same; when the walking direction changes, the device orientation relative to the user body is fixed.

In this situation, the walking direction may be determined reliably. First, the device orientation relative to the user body change is detected. Second, the PDR frame is realigned, and the walking direction is adjusted according to the difference between the new device heading and old device heading.

In order to detect the device orientation change, the orientation statistics of the most recent 9 steps are recorded, i.e., $(O_k^{mean}\ O_k^{std})$ k=1, ..., 9, where $O_k^{mean}$ and $O_k^{std}$ are the mean and standard deviation of the device Euler angles within step k as follows $$O_k^{mean}=\text{mean}(q2\text{euler}(q_{t(k):t(k)+stepRange(k)}^{pdr})), \quad (12)$$

$$O_k^{std}=\text{std}(q2\text{euler}(q_{t(k):t(k)+stepRange(k)}^{pdr})), \quad (13)$$

where t(i) is the starting index of the kth step and stepRange(k) is the sample size within the kth step.

Assume device orientation change finishes in n<4 steps. Table 1 below includes pseudo code defining various algorithms for determining the walking direction in this situation.

TABLE 1

```
//* Detecting the phone orientation change
// threshold for non-heading change: it should be larger
// than 3 times of its standard deviation but no less than 0.3
Threshold = max(sum(3*0_{4-n}^{std}(1:2)), 0.3)
// the non-heading changes between n steps.
odis = sum(abs(0_5^{mean}(1: 2) - 0_{5-n}^{mean}(1: 2)))
if odis> Threshold
// *Detecting the phone orientation become stable
for m =0 : (4-n)
    orienDistStable = sum(abs(0_{5+m}^{mean}(1: 2) -
    0_{5+m+n}^{mean}(1:2)))
        If orienDistStable < sum(3*0_{5+m+n}^{std}(1:2))
            kOnset = m
            Break
    End
Qini = q_{t(5+kOnset)}^{game}
headingIni = device heading at (5-n)th step
// Device orientation in new PDR frame
    q_k^{pdr} = qmult(q_k^{game},qconj(Qini))
// Device heading after the detection
    φ_k = headingIni + yaw(q2euler(q_k^{pdr}))
```

Threshold might be tuned within a range of [20 40] degrees. If it is too small or too big, a false detection and/or a missing detection may occur. Detection of device orientation change may use orientation statistics of more or fewer than the most recent 9 steps.

Example Communications System

The methods, apparatuses and systems provided herein are well-suited for communications involving both wired and wireless networks. Wired networks are well-known. An overview of various types of wireless devices and infrastructure is provided with respect to FIGS. 4A-4D, where various elements of the network may utilize, perform, be arranged in accordance with and/or be adapted and/or configured for the methods, apparatuses and systems provided herein.

Figure 4A:
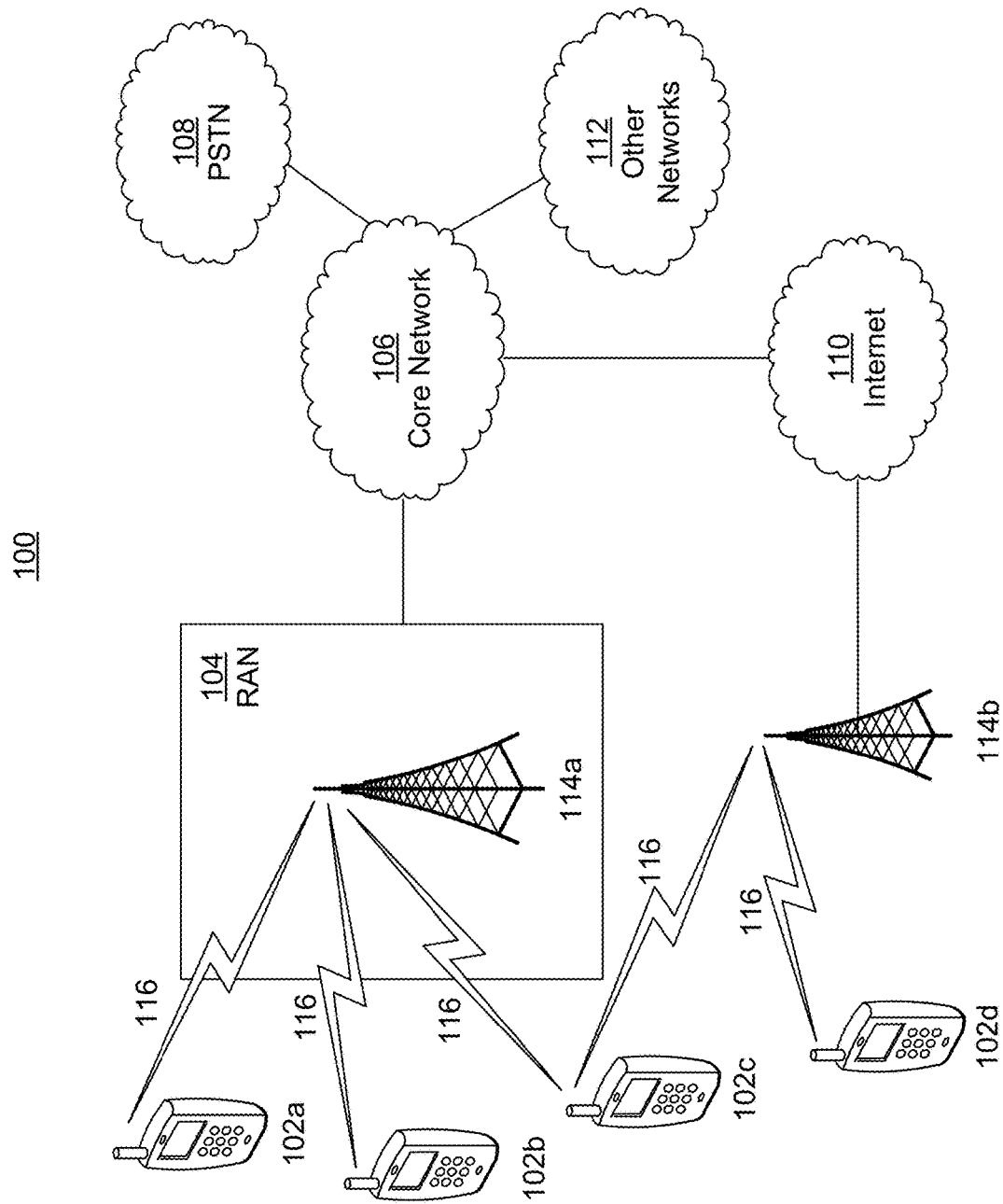
FIGS. 4A-4D are block diagrams illustrating a representative communications system in which one or more embodiments may be implemented

FIG. 4A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 4A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 4A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 4A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 4A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 4A may be configured to communicate with the base station 114a, which may employ a cellular-based radio technology, and with the base station 114b, which may employ an IEEE 802 radio technology.

Figure 4B:
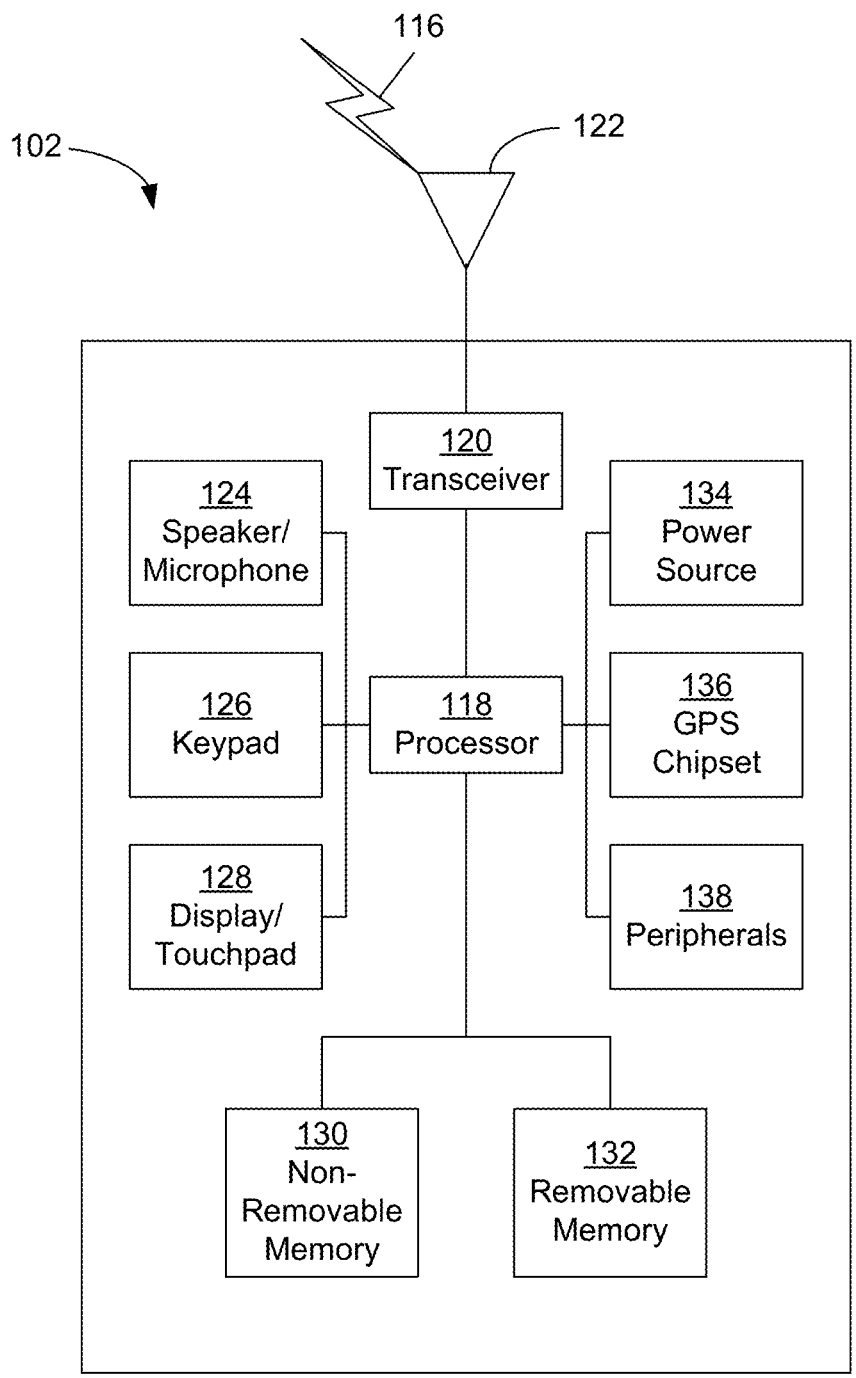

FIG. 4B is a system diagram of an example WTRU 102. Example WTRU 102 is provided for the purpose of illustration only and is not limiting of the disclosed embodiments. As shown in FIG. 4B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 4B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 4B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 4C:
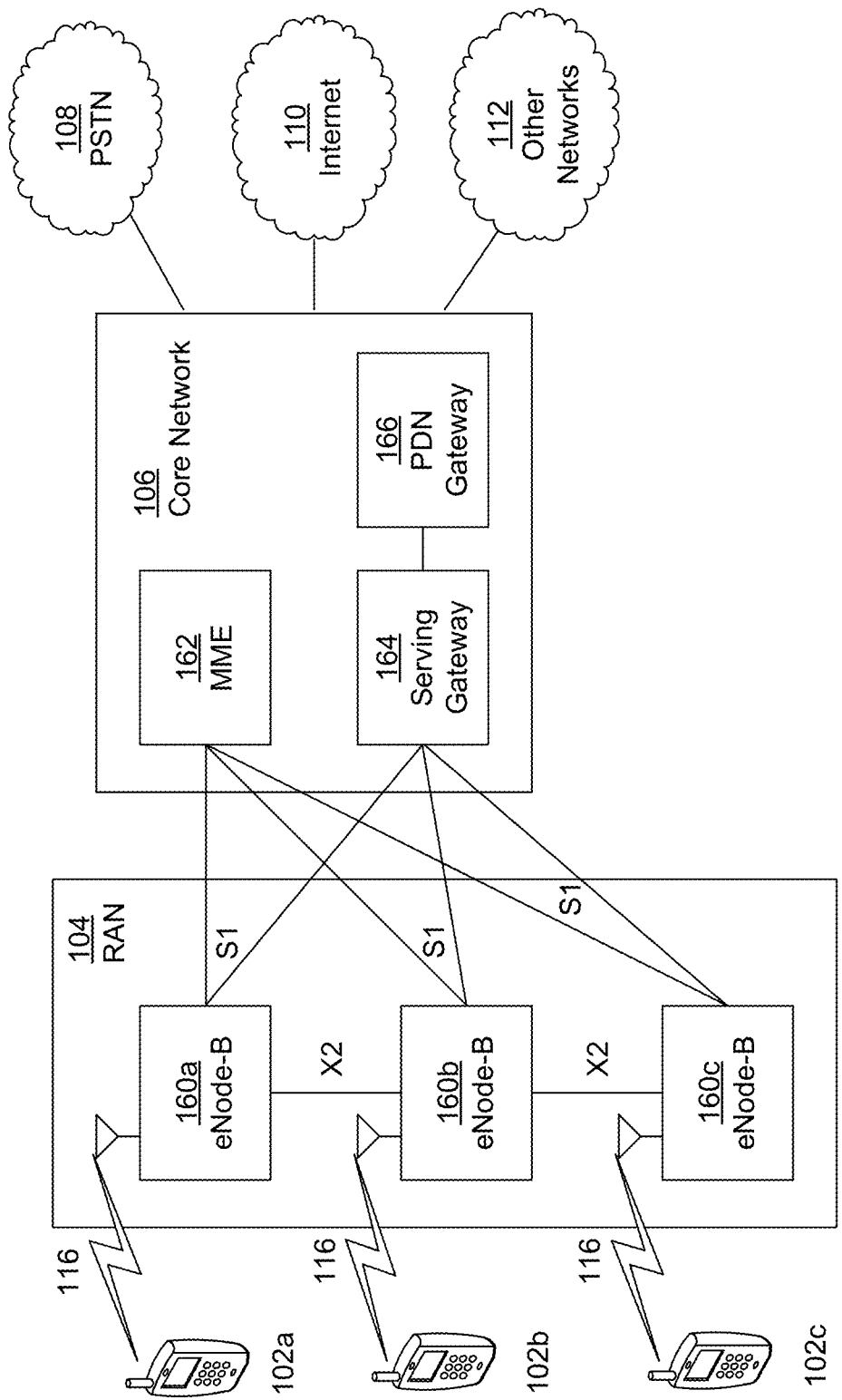

FIG. 4C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 4C, the eNode-Bs 160a, 160b, 160c may communicate with one another over an X2 interface.

The core network 106 shown in FIG. 4C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 4A-4D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.1 in, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.1 in, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 4D:
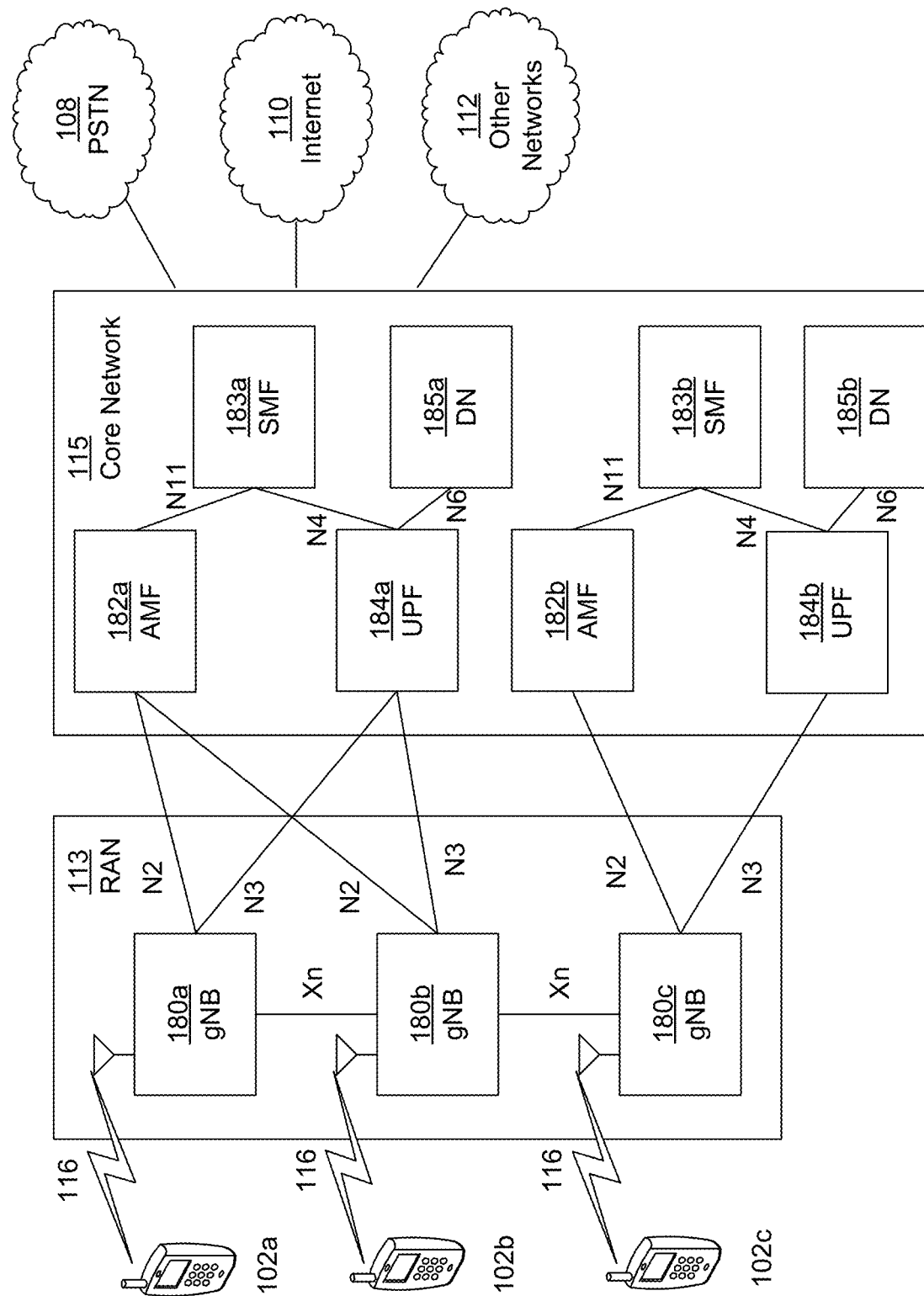

FIG. 4D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 4D, the gNBs 180a, 180b, 180c may communicate with one another over an Xn interface.

The CN 115 shown in FIG. 4D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 4A-4D, and the corresponding description of FIGS. 4A-4D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 4A-4D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, 6 or means-plus-function claim format, and any claim without the terms "means for" is not so intended.

What is claimed is:

1. A method directed to pedestrian dead reckoning (PDR) using a device comprising a processor, a three-axis accelerometer and a three-axis gyroscope, the method comprising:
performing step detection of a pedestrian, at the processor, based on acceleration measurements output from the three-axis accelerometer;
obtaining, at the processor, a step length for a detected step;
determining, at the processor, an initial device orientation based on first linear acceleration measurements and first angular velocity measurements output from the three-axis accelerometer and the three-axis gyroscope, wherein the first linear acceleration measurements and the first angular velocity measurements are associated with a start of the detected step;
determining, at the processor, multiple sub-step headings along the step length, wherein each sub-step heading is based on a device orientation relative to the initial device orientation, wherein each device orientation is based on second linear acceleration measurements and second angular velocity measurements output from the three-axis accelerometer and the three-axis gyroscope, and wherein the second linear acceleration measurements and the second angular velocity measurements are associated with a point along the step length;

determining, at the processor, a device trajectory based on the multiple sub-step headings;

determining, at the processor, a step heading as a function of the device trajectory; and outputting the step heading.

2. The method of claim 1, wherein determining an initial device orientation comprises:

determining the initial device orientation based on an angular position derived from the first linear acceleration measurements and the first angular velocity measurements.

3. The method of claim 2, wherein the angular position is referenced to a frame having any of (i) a heading that is not determined from geomagnetic measurements made locally at the device and (ii) an arbitrary heading.

4. The method of claim 1, wherein the initial device orientation defines a device heading of zero.

5. The method of claim 1, wherein each device orientation is based on an angular position derived from the second linear acceleration measurement and the second angular velocity measurements.

6. The method of claim 5, wherein the angular position is referenced to a frame having any of (i) a heading that is not determined from geomagnetic measurements made locally at the device and (ii) an arbitrary heading.

7. The method of claim 5, wherein determining an initial device orientation comprises:

determining the initial device orientation based on an angular position derived from the first linear acceleration measurements and the first angular velocity measurements.

8. The method of claim 5, wherein determining an initial device orientation comprises transforming the angular position derived from the first linear acceleration measurements and the first angular velocity measurements to define a PDR frame having a heading of zero degrees; and wherein determining multiple sub-step headings along the step length comprises:

for each device orientation, device heading transforming the angular position derived from the second linear acceleration measurements and the second angular velocity measurements so as to refer from the PDR frame.

9. The method of claim 1, wherein obtaining a step length of a detected step comprises:

determining the step length based on the acceleration measurements that correspond to movement of the device along an axis perpendicular to a plane defined by translational movement of the device associated with the detected step.

10. The method of claim 1, wherein obtaining a step length of a detected step comprises:

determining the step length based on the acceleration measurements that correspond to movement of the device along an axis aligned to gravity.

11. An apparatus comprising a processor, a three-axis accelerometer and a three-axis gyroscope, wherein the processor is configured to:

perform step detection of a pedestrian based on acceleration measurements output from the three-axis accelerometer;

obtain a step length for a detected step;

determine an initial device orientation based on first linear acceleration measurements and first angular velocity measurements output from the three-axis accelerometer and the three-axis gyroscope, wherein the first linear acceleration measurements and the first angular velocity measurements are associated with a start of the detected step;

determine multiple sub-step headings along the step length, wherein each sub-step heading is based on a device orientation relative to the initial device orientation, wherein each device orientation is based on second linear acceleration measurements and second angular velocity measurements output from the three-axis accelerometer and the three-axis gyroscope, and wherein the second linear acceleration measurements and the second angular velocity measurements are associated with a point along the step length;

determine a device trajectory based on the multiple sub-step headings;

determine a step heading as a function of the device trajectory; and output the step heading.

12. The apparatus of claim 11, wherein the processor is configured to:

determine the initial device orientation based on an angular position derived from the first linear acceleration measurements and the first angular velocity measurements.

13. The apparatus of claim 12, wherein the angular position is referenced to a frame having any of (i) a heading that is not determined from geomagnetic measurements made locally at the apparatus and (ii) an arbitrary heading.

14. The apparatus of claim 11, wherein the initial device orientation defines a device heading of zero.

15. The apparatus of claim 11, wherein each device orientation is based on an angular position derived from the second linear acceleration measurement and the second angular velocity measurements.

16. The apparatus of claim 15, wherein the angular position is referenced to a frame having any of (i) a heading that is not determined from geomagnetic measurements made locally at the apparatus and (ii) an arbitrary heading.

17. The apparatus of claim 15, wherein the processor is configured to: determine the initial device orientation based on an angular position derived from the first linear acceleration measurements and the first angular velocity measurements.

18. The apparatus of claim 15, wherein the processor is configured to:

determine an initial device orientation at least in part by transforming the angular position derived from the first linear acceleration measurements and the first angular velocity measurements to define a PDR frame having a heading of zero degrees; and determine the multiple sub-step headings at least in part by:

for each device orientation, device heading transforming the angular position derived from the second linear acceleration measurements and the second angular velocity measurements so as to refer from the PDR frame.

19. The apparatus of claim 11, wherein the processor is configured to: determine the step length based on the acceleration measurements that correspond to movement of the device along an axis perpendicular to a plane defined by translational movement of the device associated with the detected step.

20. The apparatus of claim 11, wherein the processor is configured to:

determine the step length based on the acceleration measurements that correspond to movement of the device along an axis aligned to gravity.

* * * * *